(12) United States Patent
Janedittakarn et al.

(10) Patent No.: US 8,195,743 B2
(45) Date of Patent: *Jun. 5, 2012

(54) EXTENSIBLE AND PROGRAMMABLE MULTI-TENANT SERVICE ARCHITECTURE

(75) Inventors: Akezyt Janedittakarn, Bellevue, WA (US); Roberto Adlich dos Santos, Sao Paulo (BR); Arash Ghanaie-Sicanie, Bothell, WA (US); Michael James Ott, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,557

(22) Filed: Jun. 24, 2011

(65) Prior Publication Data

US 2011/0252089 A1    Oct. 13, 2011

Related U.S. Application Data

(63) Continuation of application No. 11/787,134, filed on Apr. 13, 2007, now Pat. No. 8,019,812.

(51) Int. Cl.
*G06F 15/16* (2006.01)
(52) U.S. Cl. ........ 709/203; 709/217; 709/223; 709/229; 709/232; 709/235; 709/241
(58) Field of Classification Search ............... 709/206, 709/217, 223, 229, 232, 241, 203, 235
See application file for complete search history.

(56) References Cited

U.S. PATENT DOCUMENTS

| | | | | |
|---|---|---|---|---|
| 6,434,619 B1 * | 8/2002 | Lim et al. | | 709/229 |
| 6,732,181 B2 * | 5/2004 | Lim et al. | | 709/229 |
| 7,366,786 B2 * | 4/2008 | Lim et al. | | 709/229 |
| 7,447,212 B2 | 11/2008 | Hu | | |
| 7,636,500 B1 * | 12/2009 | Arant et al. | | 382/305 |
| 7,680,848 B2 | 3/2010 | Janedittakarn et al. | | |
| 8,019,812 B2 | 9/2011 | Janedittakarn et al. | | |
| 2004/0024846 A1 * | 2/2004 | Randall et al. | | 709/219 |
| 2005/0049937 A1 | 3/2005 | Sanders | | |
| 2005/0283478 A1 | 12/2005 | Choi et al. | | |
| 2006/0184410 A1 * | 8/2006 | Ramamurthy et al. | | 705/8 |
| 2006/0235715 A1 | 10/2006 | Abrams et al. | | |
| 2006/0235831 A1 | 10/2006 | Adinolfi et al. | | |

(Continued)

FOREIGN PATENT DOCUMENTS

WO    WO 2008/127871    10/2008

OTHER PUBLICATIONS

Chong, F. et al., "Architecture Strategies for Catching the Long Tail," *Microsoft Corporation*, 22 pages (Apr. 2006).
International Search Report and Written Opinion mailed Aug. 20, 2008 in International Application No. PCT/US2008/059061.

(Continued)

*Primary Examiner* — Michael Won
(74) *Attorney, Agent, or Firm* — Merchant & Gould (57) ABSTRACT

An extensible, multi-tenant software-as-a-service business application platform is provided for hosting multiple organizations. Organization services are provided by virtual or physical servers with dedicated data stores assembled in scalable groups. Distributed interaction between components of the scalable groups may enable extensibility and reliability, while changes in locations of organization services are provided to the client(s) for seamless continuation of the client's access to the services. Customizable and dynamic APIs for accessing each organization's data and applications isolated from the others and pluggable third party authentication services may also be integrated into the platform.

20 Claims, 8 Drawing Sheets

EXAMPLE SINGLE TENANT SERVICE MODEL

U.S. PATENT DOCUMENTS

| | | |
|---|---|---|
| 2007/0005766 A1 | 1/2007 | Singhal et al. |
| 2007/0162537 A1 | 7/2007 | Juncker |
| 2008/0005305 A1 | 1/2008 | Hass et al. |
| 2008/0091834 A1* | 4/2008 | Norton .......................... 709/229 |
| 2008/0114683 A1* | 5/2008 | Neveu et al. .................... 705/50 |
| 2008/0201767 A1 | 8/2008 | Williams et al. |
| 2008/0243867 A1 | 10/2008 | Janedittakarn et al. |
| 2008/0256607 A1 | 10/2008 | Janedittakarn et al. |
| 2009/0320119 A1* | 12/2009 | Hicks et al. ....................... 726/9 |
| 2010/0153569 A1* | 6/2010 | Schreiber .................... 709/229 |

OTHER PUBLICATIONS

Chong et al., "Multi-Tenant Data Architecture" http://www.wrappedapps.com/files/729.pdf, Published Date: Jun. 2006, 31 pp.

Witters et al., "VPLS Technical Tutorial Published", http://beta.ipexpp.co.uk/content/download/14379/249583/file/VPLS-Technical-Tutorial.pdf, Published Date: 2004, 9 pp.

Chinese First Office Action dated Dec. 31, 2010 in Application No. 200880011804.4, pp. 1-7.

* cited by examiner

EXAMPLE SINGLE TENANT
SERVICE MODEL

*FIG. 1*

*EXAMPLE MULTI-TENANT SERVICE MODEL*

*EXAMPLE ORGANIZATIONAL SERVICE ARCHITECTURE*

*FIG. 4*

*ACTIONS IN AN EXAMPLE EXTENSIBLE MULTI-TENANT SYSTEM*

*FIG. 5*

NETWORK ENVIRONMENT

EXTENSIBLE AND PROGRAMMABLE MULTI-TENANT SERVICE ARCHITECTURE

CROSS-REFERENCE TO RELATED APPLICATIONS

This application is a continuation of U.S. application Ser. No. 11/787,134, filed on Apr. 13, 2007, which is incorporated herein by reference in its entirety.

BACKGROUND

Business efforts strive to respond to customer demands quickly, get products to market faster, increase overall profitability, and consistently outperform the competition. Agility, the ability to meet these common market challenges, is dependent on a solid business application technology platform. To achieve business agility, a multifaceted, intelligent software infrastructure is needed that is designed for application integration.

Business application platforms are typically single tenanted, meaning that they can host applications only for a single organization and all the platform resources are dedicated only to that organization. Such platforms are typically hosted by the customer and installed and deployed within their company premises. The cost for deploying and maintaining such platform may be high and the return-on-investment not optimized.

On the other hand, designing and managing multi-tenant systems has its own challenges. In a practical multi-tenant system, each client may have a different schema for connecting to their organization. Furthermore, each client may connect to multiple organizations rendering the management of such systems a very complex task from security, traffic management, reliability, and extensibility aspects.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing an extensible, multi-tenant software-as-a-service model for serving multiple organizations from a single platform. A platform according to embodiments may include a discovery service for providing clients information associated with a location and configuration of the organization services hosted by the platform. The client is then enabled to access the organization services, which may be hosted in scalable clusters. Location changes may be provided to the client(s) for uninterrupted access of the client to the requested service(s).

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, an extensible multi-tenant business application platform may be provided employing a discovery service and scalable server clusters. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
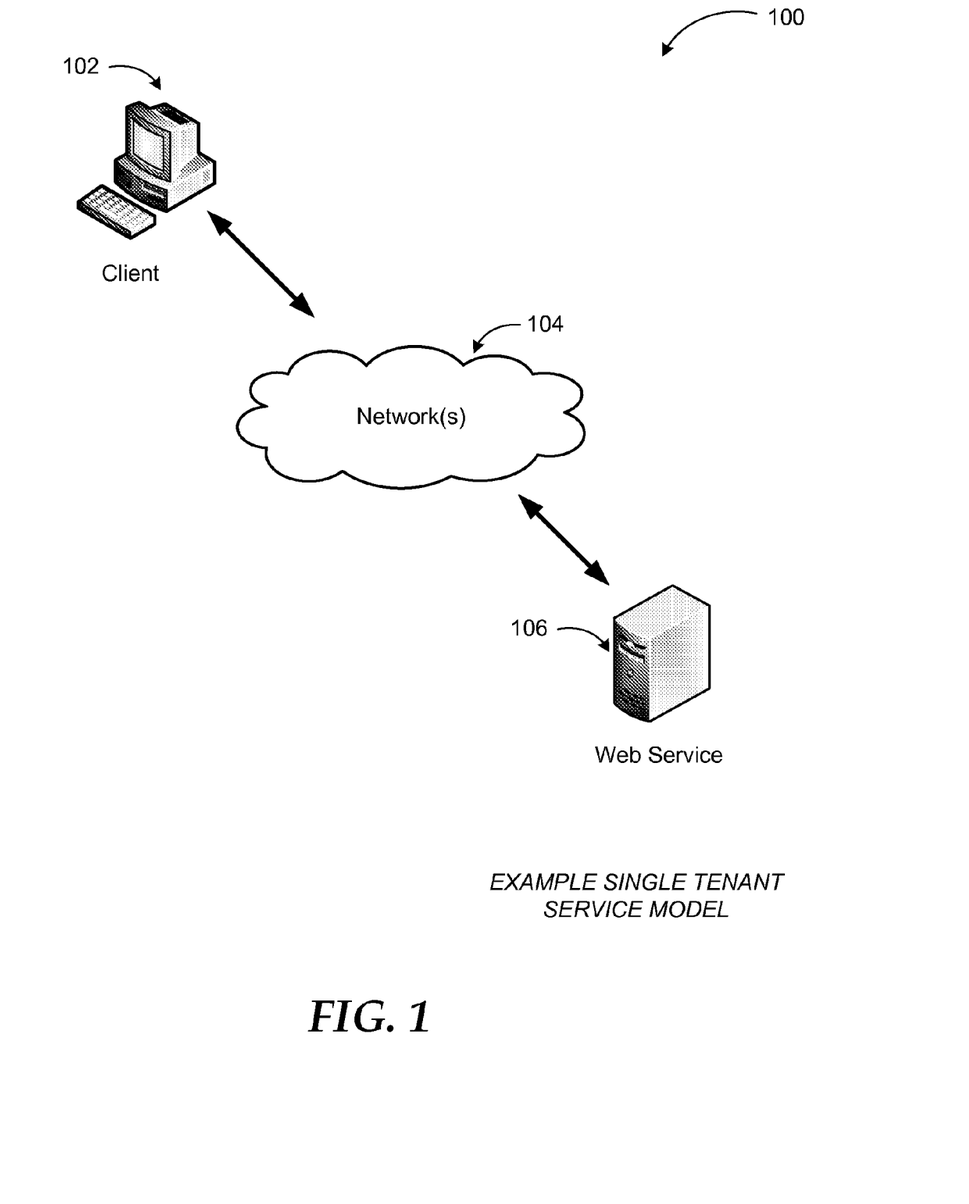
FIG. 1 illustrates an example single tenant service model.

Referring to FIG. 1, diagram 100 of an example single tenant service model is illustrated. As mentioned previously, programmability architectures for typical business application platforms are single-tenanted and suited for on-premise hosted applications.

In such a typical single tenanted platform, client 102 accesses data and business applications associated with a single tenant that is hosted by web service 106 through networks 104. While networks 104 may be the Internet, it is commonly an intranet type combination of networks. Since a single tenant is hosted by the service, authentication, security, and other preliminary operations may be performed by the service itself, rather than using a third party service. The location of the services does typically not change, although redundancy and some load balancing operations may involve use of multiple servers and/or server clusters.

Thus, operations in a single-tenanted system are relatively simple and straight forward. However, in today's business world, many organizations prefer to outsource their business application platforms to entities that can provide efficient, cost-effective, and reliable service. In order to streamline their business model and efficiently utilize their resources, such entities may prefer to host services for multiple organizations. Furthermore, some clients may be associated with multiple organizations, in which case it would make sense for the client to access all organizations through a single contact point.

Figure 2:
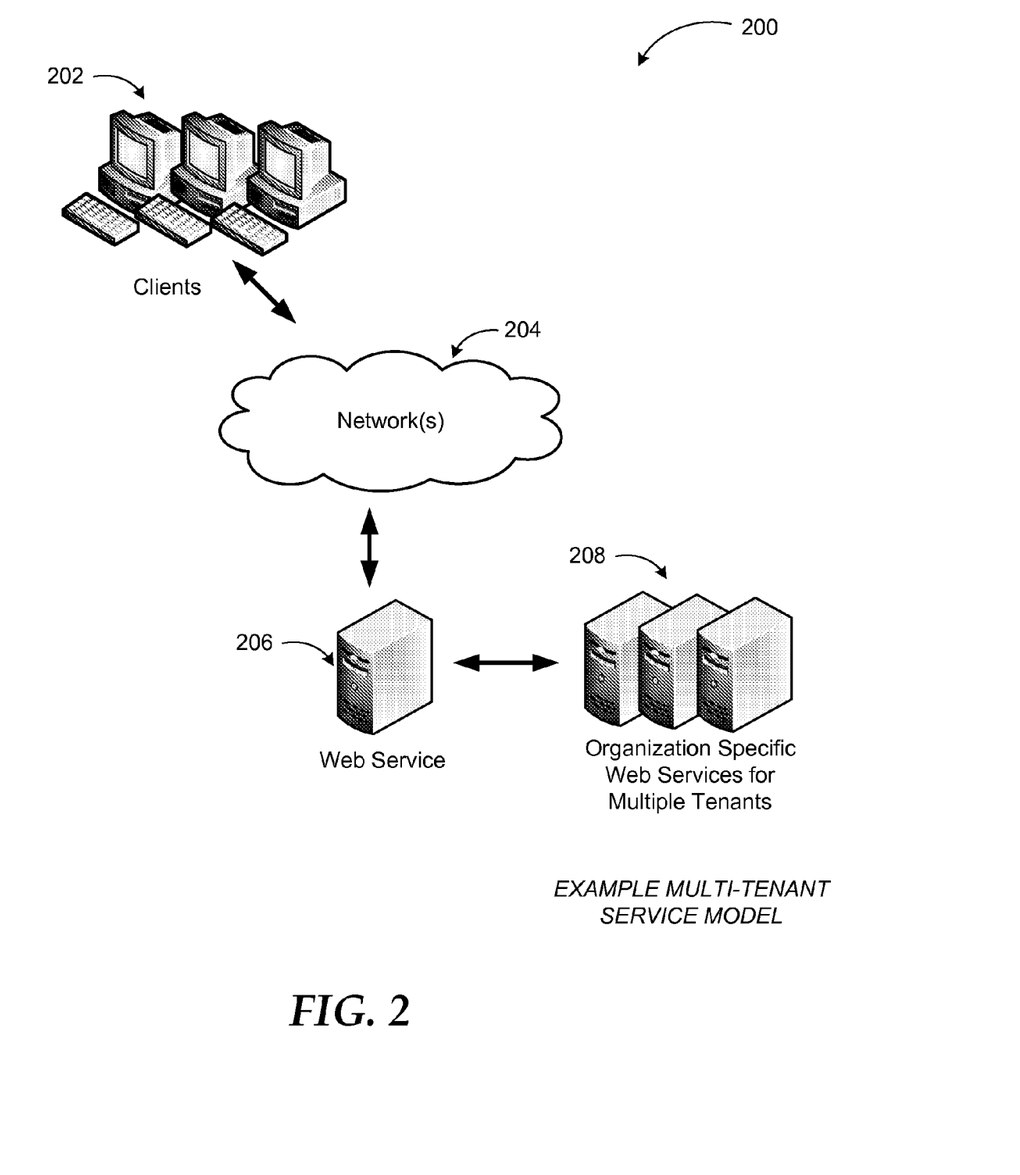
FIG. 2 illustrates an example multi-tenant service model.

FIG. 2 illustrates an example multi-tenant service model 200. In a multi-tenant service, a business application platform hosts services for multiple organizations. Any number of clients 202 may call in to web service 206 through networks 204, which in this case is more likely to be the Internet or a combination of diverse networks, for access to data and applications associated with one or more organizations.

Web service 206 may perform management services and direct clients to organization specific web services 208. Additionally, web service 206 may perform authentication, security check, and similar preliminary services optionally using third party services. Organization specific web services 208 may include scalable clusters, where individual organizations' operations may be moved for load balancing and other reasons. Web service 206 may monitor such changes and redirect the calling client accordingly, such that the change is transparent to the client.

Clients may be thin or thick clients with additional services optionally provided by third party applications in the case of thin clients. Different clients may access different services using distinct schemas. Some of the services may also share the schemas.

The architecture in FIG. 2—for that matter also FIG. 1—is for illustrating an overview of software-as-a-service platforms. Only essential components are illustrated for simplicity purposes. In practice, such systems include many more components with specific tasks and communication methods. A more detailed discussion of such a platform according to embodiments is provided below.

Figure 3:
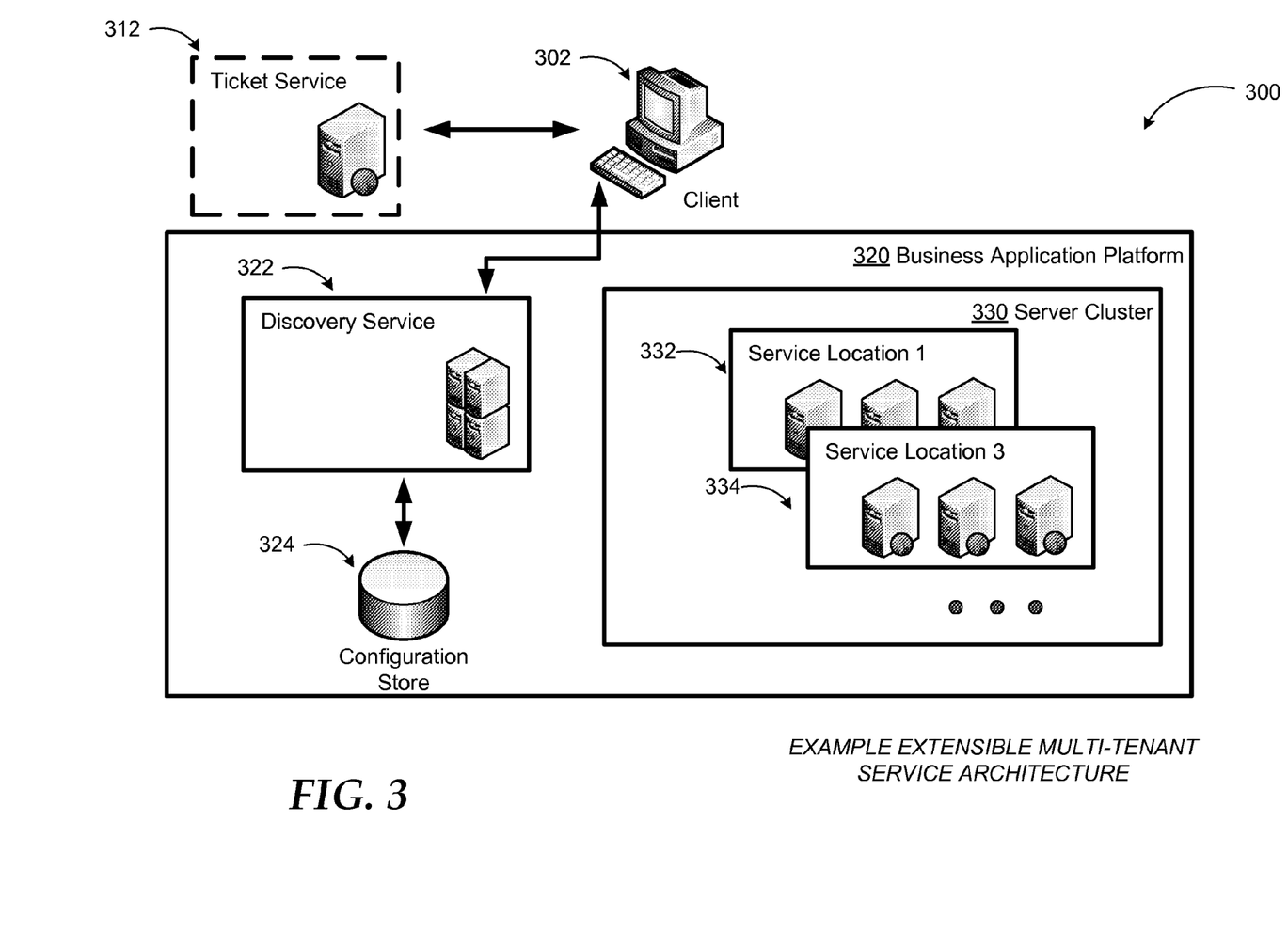
FIG. 3 illustrates an extensible multi-tenant service architecture according to embodiments.

FIG. 3 illustrates an extensible multi-tenant service architecture 300 according to embodiments. A software-as-a-service business application platform 320 according to embodiments may be implemented in different sites and be capable of hosting multiple organizations' data and applications in each site. Each site installation of the platform 320 may be highly scalable enabling high performance and availability of services. The sites may be hosted on the Internet or on intranets.

According to some embodiments, the service may use an optional trusted third party authentication service for authenticating the users (client 302) of each organization (e.g. ticket service 312). Independent plug-in authentication services may also be used for Internet or intranet modes. According to other embodiments, access to each organization's data and operations may be restricted based on security roles and privileges and organization membership.

According to some implementations, each organization's data and applications may be isolated from the others and accessed through a set of dedicated of APIs. The APIs may enable developers to access and modify business data as well as define/invoke/modify business processes and logic remotely over the Internet. The APIs may be automatically generated and dynamic, so that whenever a new organization is added to or removed from the platform, the APIs can automatically adjust. The APIs may also be customizable allowing custom objects and operations to be added to each organization separate from other organizations.

Discovery service 322 provides authentication and organization discovery services enabling a client 302 to sign in into the platform 320 and discover all the organizations that he/she is a member of. Discovery service 322 may provide detailed configuration data about each organization including its location within the platform for direct access and other configuration information. The configuration information may be stored in and retrieved from configuration store 324. A user (client) can be a member of one or more organizations hosted in a site. The discovery service 322 may operate in multiple authentication modes. Each authentication mode may have its own dedicated endpoint enabling the client to specify what authentication should be used.

According to further embodiments, each API endpoint may serve multiple organizations. Each call to the API may identify the target organization intended to reach. The discovery service 322 may use configuration store 324 to retrieve organization configuration data. An administrator may be enabled to access and maintain the configuration store 324.

Organization data and operations may be placed in a plurality of scalable groups (service locations 1, 2, etc.) available within a service cluster 330 of the platform 320. An organization's location may change and move between the scalable groups for load balancing purposes. The extensible multi-tenant service model is dynamic in a sense that it can locate the target organization even after a move. Each service location (332, 334 . . . ) may include one or more virtual or physical servers providing the services.

Figure 4:
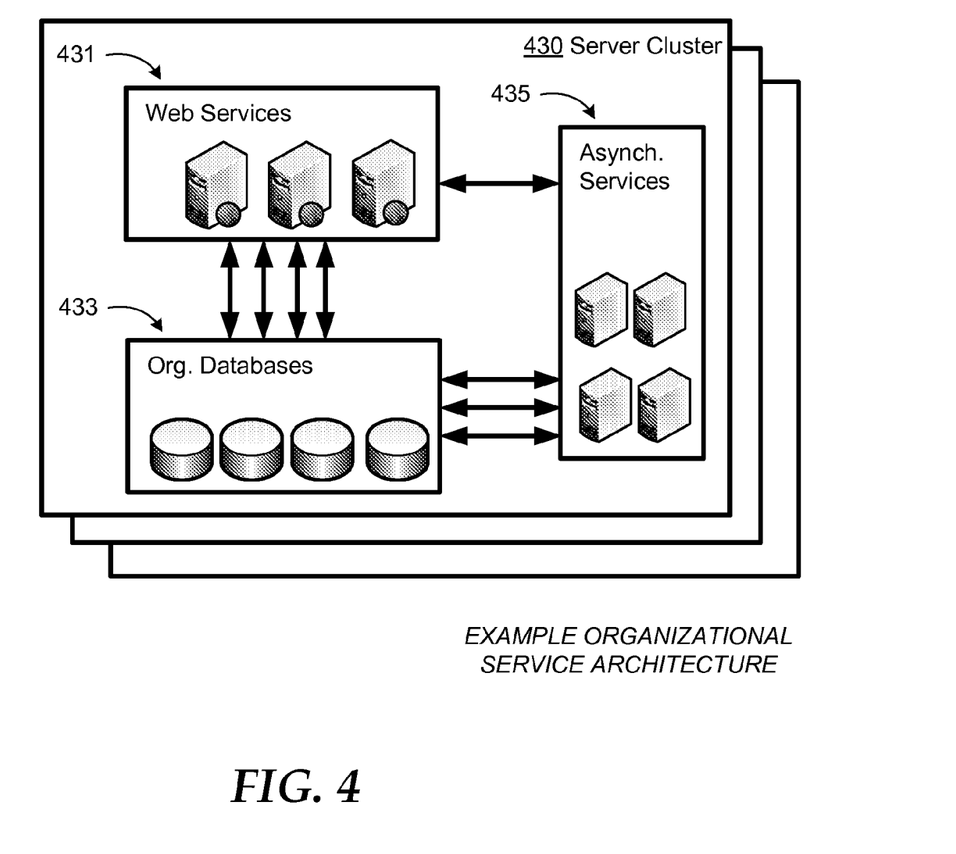
FIG. 4 illustrates example components of an organization service portion of a multi-tenant service.

FIG. 4 illustrates example components of an organization service portion of a multi-tenant service. As mentioned above, scalable server clusters 430 are at the core of an extensible multi-tenant software-as-a-service platform. According to some embodiments, server clusters 430 may include a group of virtual or physical web servers 431 that receive the client request, handle synchronous requests, and manage access to organization databases 433. A particular server among web servers 431 may be assigned to the client by random selection, according to a predefined algorithm (e.g. a load balancing algorithm), and the like. Organization databases 433 may include physical or virtual data stores for each organization (or tenant) served by the platform. For example, a financial services system may include separate databases for each of the participating financial organizations (banks, etc.) that store account information, account access information, and so on. Information about the individual databases, their configuration, any redundancies, and the like, may be stored in configuration store 324 of FIG. 3.

According to other embodiments, a locator service (not shown) may provide information about which database(s) may be used by the web servers. Web servers 433 may also place asynchronous service requests in queues to be handled by asynchronous servers 435 in conjunction with organization databases 433. As a client request comes up in the queue, one of the asynchronous servers 435 may be contacted for processing the request. A relationship between the asynchronous servers and the individual organization databases may be a distributed one, where each server may work with any one of the databases. This distributed interaction between the asynchronous servers and the organization databases may provide the ability to automatically recover from failures in the asynchronous processing machines by allowing the databases to connect to another available server when one fails.

Due to the independent distribution of synchronous and asynchronous work and the interaction between the servers and the databases, any part of the server cluster 430 is scalable. Thus, multiple instances of the servers (and/or databases) may be provided to address increased workload, additional organizations, data capacity, and so on.

Figure 5:
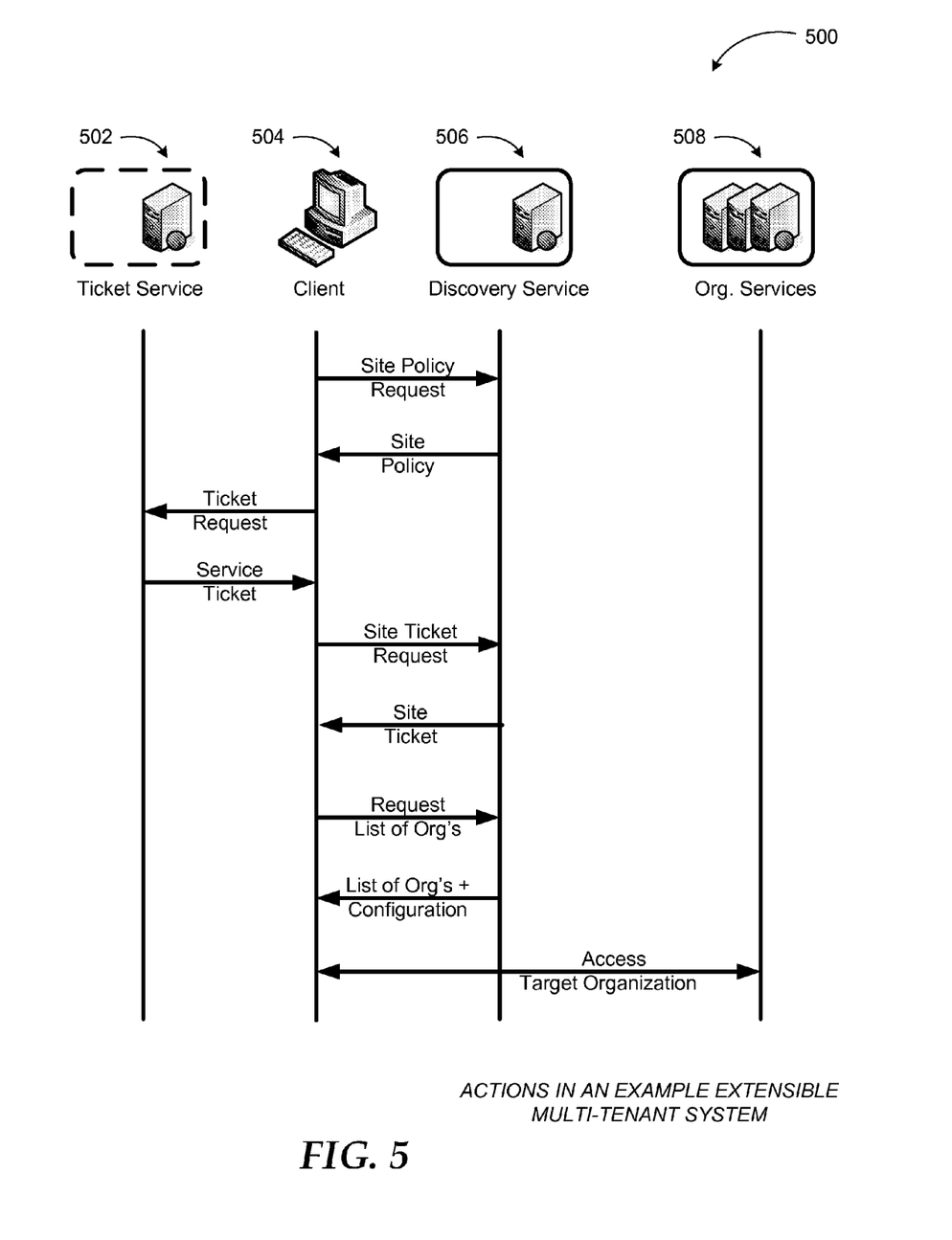
FIG. 5 is an action diagram illustrating interactions between a client and components of a multi-tenant service during operations.

FIG. 5 is an action diagram illustrating interactions between a client and components of a multi-tenant service during operations. The interactions in action diagram 500 illustrate an example operation with specific steps. Interactions in a multi-tenant platform according to embodiments may include different exchanges with fewer or additional steps, as well as a different order of interactions.

According to the example operation, client 504 initiates a call by requesting a site policy from discovery service 506. Discovery service 506 responds with the site policy, which may identify an optional ticket service 502 (e.g. for authentication). If the optional third party ticket service 502 is used, client 504 may send a ticket request to the ticket service 502, and receive the service ticket if the client's credentials are confirmed for access to a requested organization (tenant).

Client 504 then submits a site ticket request with the service ticket from ticket service 502 to discovery service 506. Discovery service 506 responds with the site ticket. Client 504 may then submit a list of requested organizations, to which discovery service 506 responds with the list of locations of the requested organizations and other configuration information (schema, etc.). Subsequently, client 504 may access the target organizations through organization services 508 using the location and configuration information provided by the discovery service 506. As indicated previously, the location of organization services may change due to scaling, load balancing, and so on. Discovery service 506 may update the client with the changed location information such that the client's access to the organization service can continue seamlessly.

The scalable multi-tenant systems and operations described in FIG. 3, through FIG. 5 are exemplary for illustration purposes. A system for extensible multi-tenant services may be implemented with additional or fewer components and operations using the principles described herein.

Figure 6:
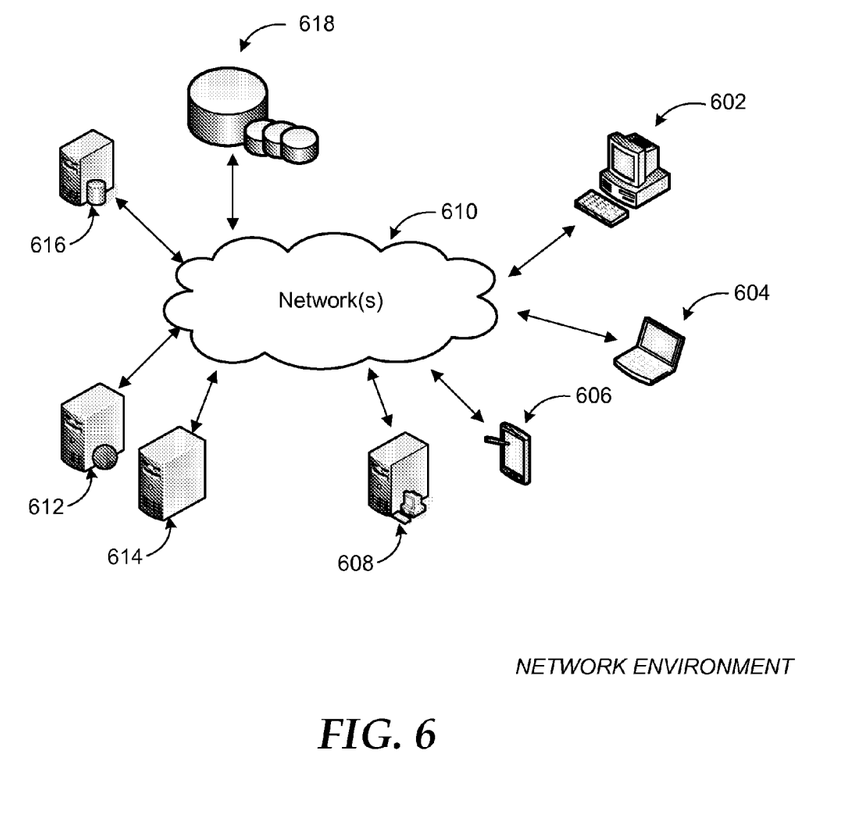
FIG. 6 is an example networked environment, where embodiments may be implemented.

FIG. 6 is an example networked environment, where embodiments may be implemented. Extensible multi-tenant service systems may be implemented in a distributed manner over a number of physical and virtual clients and servers. They may also be implemented in un-clustered systems or clustered systems employing a number of nodes communicating over one or more networks (e.g. network(s) 610).

Such a system may comprise any topology of servers, clients, Internet service providers, and communication media. Also, the system may have a static or dynamic topology. The term "client" may refer to a client application or a client device. While a networked system implementing extensible multi-tenant services may involve many more components, relevant ones are discussed in conjunction with this figure.

Requests for access may come from tenants using individual client devices 602-606 or application server 608 in a networked multi-tenant system. Such a system may also be implemented, in one or more servers (e.g. servers 612, 614) and accessed by the client devices (or applications). One or more web servers (physical or virtual) such as web server 612 may receive the requests and direct them to the appropriate resource. The resources may include scalable server clusters with synchronous and asynchronous server, organization databases, and other components.

Organization databases may be embodied in a single data store such as data store 618 or distributed over a number of data stores. Dedicated database servers (e.g. database server 616) may be used to coordinate data retrieval and storage in one or more of such data stores.

Network(s) 610 may include a secure network such as an enterprise network, an unsecure network such as a wireless open network, or the Internet. Network(s) 610 provide communication between the nodes described herein. By way of example, and not limitation, network(s) 610 may include wired media such as a wired network or direct-wired connection, and wireless media such as acoustic, RF, infrared and other wireless media.

Many other configurations of computing devices, applications, data sources, data distribution systems may be employed to implement an extensible multi-tenant service platform. Furthermore, the networked environments discussed in FIG. 6 are for illustration purposes only. Embodiments are not limited to the example applications, modules, or processes.

Figure 7:
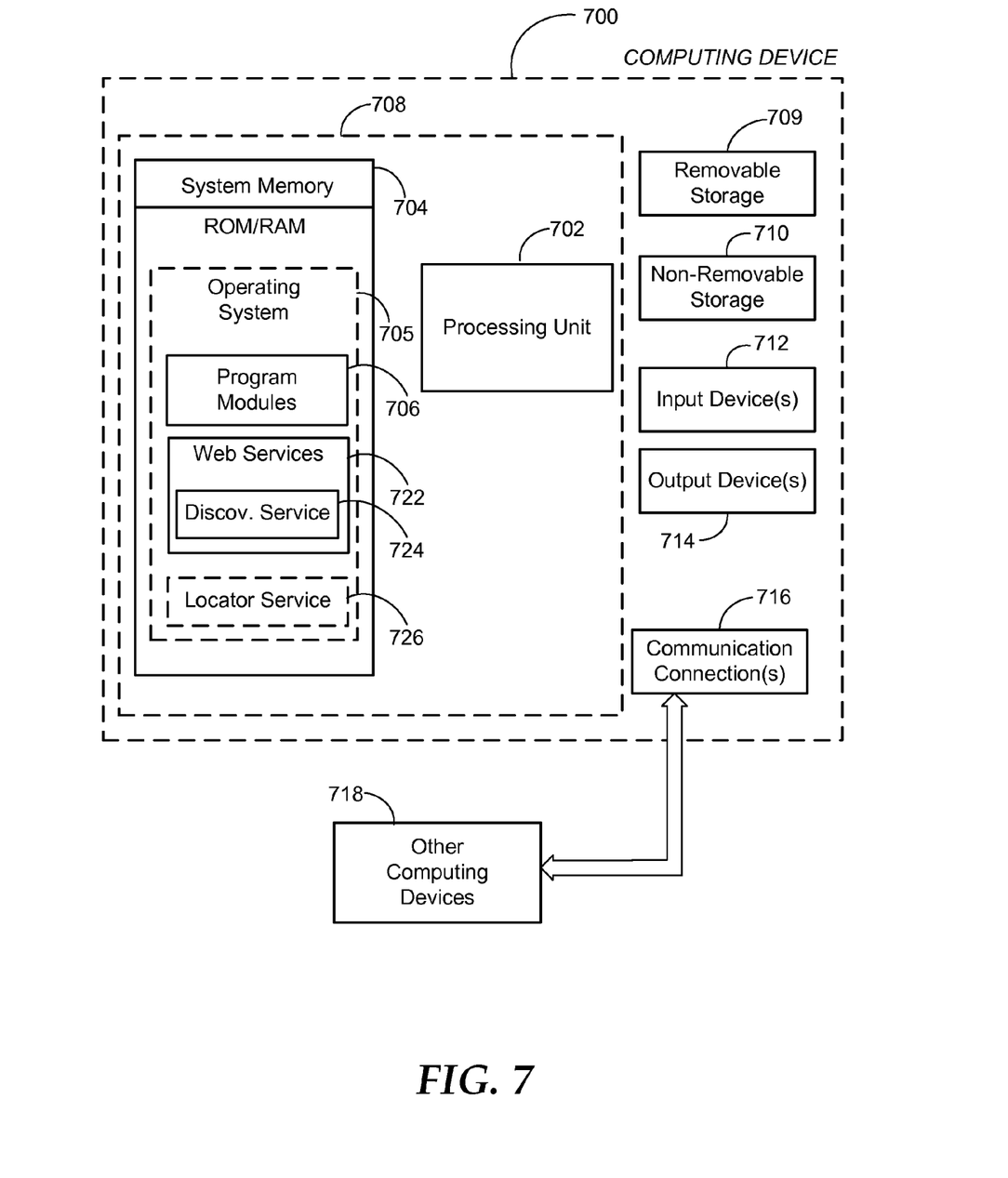
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be a server providing management services associated with an extensible multi-tenant service and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of a networked personal computer, such as the WINDOWS® operating systems from MICROSOFT CORPORATION of Redmond, Wash. The system memory 704 may also include one or more software applications such as program modules 706, Web services 722, a discovery service 724 within web services 722, and an optional locator service 726.

Web services 722 may be a separate application or an integral module of a hosted multi-tenant service platform that provides data and processing services to client applications associated with computing device 700. Discovery service 724 may provide location and configuration information associated with individual organization (tenant) services to a client requesting access to those. Optional locator service 726 may provide services associated with determining a purpose of the service and which databases to use for web servers, as well as asynchronous processing servers, as described previously. This basic configuration is illustrated in FIG. 7 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include server(s) that execute applications associated with a location service or other services. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
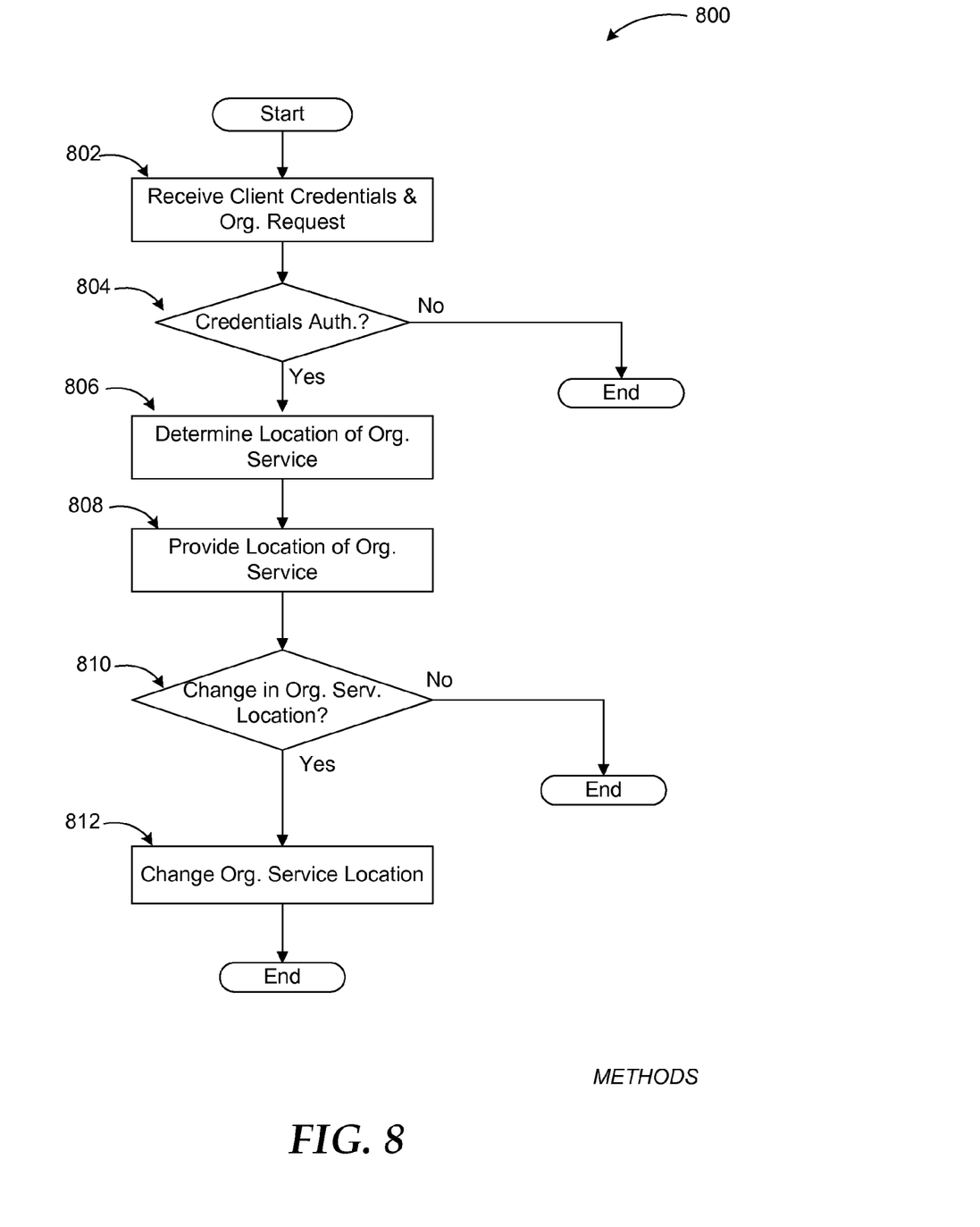
FIG. 8 illustrates a logic flow diagram for a process of providing extensible multi-tenant service to a client.

FIG. 8 illustrates a logic flow diagram for process 800 of providing extensible multi-tenant service to a client. Process 800 may be implemented as part of a software-as-a-service business application platform.

Process 800 begins with operation 802, where a request for accessing one or more organizations is received from a client along with the client credentials. As described previously, clients of a multi-tenant hosted service are typically associated with organizations or tenants each of which has a service including a dedicated database within the system. Prior to receiving the request, the client may optionally use a third party authentication service. Processing advances from operation 802 to decision operation 804.

At decision operation 804, a determination is made whether the client is authenticated. The determination may also include a check of whether the requested organization(s) are hosted by the multi-tenant service platform. If the client is authenticated, the process advances to operation 806. Otherwise, processing moves to a calling process for further actions.

At operation 806, a location of the requested organization service is determined. Processing moves from operation 806 to operation 808, where the location of the organization service is provided to the client for access. Additional configuration information may also be provided along with the location information. After operation 808, processing moves to decision operation 810.

At decision operation 810, a determination is made whether the location of the organization service is changed due to scaling, load balancing, and so on. If a change in the location is determined, processing moves to operation 812. Otherwise, processing moves to a calling process for further actions.

At operation 812, the change in the location of the organization service is provides to the client such that the client's access to the service can continue seamlessly. After operation 812, processing moves to a calling process for further actions.

The operations included in process 800 are for illustration purposes. Providing extensible multi-tenant service to a client may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing an extensible multi-tenant service platform, comprising:
   receiving a request for access from a client, wherein each client in a plurality of clients is associated with at least one organization service hosted by the platform;
   providing a location of the at least one organization service to the client to enable access to the at least one organization service; and
   automatically providing a plurality of dynamic and dedicated Application Programming Interfaces (APIs) configured to provide access to a plurality of organization services comprising the at least one organization service, such that data and applications associated with the at least one organization service are isolated from other organization services in the plurality of organization services.

2. The method of claim 1, further comprising:
   determining a location of the at least one organization service prior to providing the location of the at least one organization service to the client, wherein the plurality of organization services are organized in scalable groups within the platform; and
   if the location of the at least one organization service changes during the access to the at least one organization service, providing the change location to the client for continued access of the client to the at least one organization service.

3. The method of claim 1, further comprising:
   authenticating the client prior to providing the location of the at least one organization service using one of an integrated authentication service and a third party authentication service.

4. The method of claim 3, wherein the client access to the at least one organization service is restricted based on at least one from a set of: a security status of client connection, a client credential, and an organization membership.

5. The method of claim 4, further comprising:
providing a plurality of authentication modes, wherein each authentication mode includes a dedicated endpoint such that the client is enabled to specify a desired authentication mode.

6. The method of claim 1, further comprising:
providing configuration information to the client associated with the client access to the at least one organization service.

7. The method of claim 1, wherein the scalable groups are configured to enable a vertical and a horizontal extensibility of applications associated with the at least one organization service hosted by the platform.

8. The method of claim 1, wherein the platform is arranged to provide metadata access for the at least one organization service hosted by the platform.

9. The method of claim 1, wherein automatically providing a plurality of dynamic and dedicated Application Programming Interfaces (APIs) configured to provide access to a plurality of organization services comprising the at least one organization service comprises providing a plurality of customizable APIs such that a user with permission is enabled to add a custom object and a custom operation to the at least one organization service separate from the other organization services.

10. A system for hosting extensible multi-tenant services, comprising:
a discovery service configured to:
receive a request for access from a client associated with at least one organization service hosted by the system; and
provide a location of the at least one organization service to the client to enable access to the at least one organization service; and
a plurality of dedicated Application Programming Interfaces (APIs) configured to provide access to the at least one organization service such that data and applications associated with the at least one organization service are isolated from other organization services, wherein the plurality of dedicated APIs are automatically generated and dynamic and wherein the APIs are customizable such that a user with permission is enabled to add a custom object and a custom operation to the at least one organization service separate from the other organization services.

11. The system of claim 10, further comprising a plurality of scalable service clusters configured to provide the at least one organization service.

12. The system of claim 11, further comprising a configuration store associated with the discovery service arranged to store configuration and location information associated with the plurality of scalable service clusters such that a change in the location of the at least one organization service during the client access to the at least one organization service is provided to the client for continued access of the client to the at least one organization service.

13. The system of claim 10, wherein the discovery service is provided as a web service.

14. The system of claim 12, wherein the discovery service is further configured to authenticate the client employing a plurality of authentication modes through a pluggable authentication service.

15. The system of claim 10, wherein the APIs are configured to enable users with permission to perform actions including:
modify data associated with the at least one organization service;
define one of a process and a logic associated with the at least one organization service;
invoke one of a process and a logic associated with the at least one organization service; and
modify one of a process and a logic associated with the at least one organization service.

16. The system of claim 12, wherein the plurality of scalable service clusters include a plurality of web servers, organization databases, and asynchronous processing servers configured to interact in a distributed manner.

17. The system of claim 10, wherein the plurality of APIs are adapted to one of an addition and a removal of an organization service.

18. A computer-readable storage device with computer-executable instructions stored thereon which, when executed by a computer, perform a method for providing an extensible multi-tenant service platform, the method comprising:
receiving a request for access from a client associated with at least one organization service hosted by the platform, wherein the request includes a credential of the client;
determining a list of organization services available to the client based on the client's credential;
providing the list of organization services to the client;
receiving a request for accessing the at least one organization service from the list;
providing the location of the at least one organization service to the client to enable access to the organization service; and
automatically generating a plurality of dynamic and dedicated Application Programming Interfaces (APIs), the APIs configured to provide access to the at least one organization service, such that data and applications associated with the at least one organization service are isolated from other organization services in the list of organization services.

19. The computer-readable storage device of claim 18, wherein the method further comprises authenticating the client prior to providing the location of the at least one organization service using one of an integrated authentication service and a third party authentication service.

20. The computer-readable storage device of claim 18, wherein the method further comprises providing configuration information to the client associated with the client access to the at least one organization service.

* * * * *